(12) United States Patent
Pengg et al.

(10) Patent No.: US 8,240,348 B2
(45) Date of Patent: Aug. 14, 2012

(54) ANTI-SKID CHAIN

(75) Inventors: Ägyd Pengg, Klagenfurt (AT);
Bernhard Niess, Ottendorf (AT)

(73) Assignee: Pewag Schneeketten GmbH & Co KG, Bruckl (AT)

( * ) Notice: Subject to any disclaimer, the term of this patent is extended or adjusted under 35 U.S.C. 154(b) by 176 days.

(21) Appl. No.: 12/556,686

(22) Filed: Sep. 10, 2009

(65) Prior Publication Data
US 2010/0065176 A1    Mar. 18, 2010

(30) Foreign Application Priority Data
Sep. 16, 2008  (AT) ................................ A 1445/2008
Aug. 12, 2009  (EP) ..................................... 09450148

(51) Int. Cl.
B60C 11/00    (2006.01)
(52) U.S. Cl. ..................... 152/245; 152/233; 152/213 A
(58) Field of Classification Search .......... 152/170–172, 152/213 A, 231, 233, 239–242, 245; 410/10–12, 410/23, 96–97, 100; 24/70 CT, 70 TT, 69 ST, 24/69 TT, 71 TT, 68 TT, 69 CT, 69 T, 69 WT, 24/71 TD, 68 AS, 68 CT, 122.3
See application file for complete search history.

(56) References Cited

U.S. PATENT DOCUMENTS

| | | | | |
|---|---|---|---|---|
| 2,685,321 A | | 9/1952 | Petrie | |
| 2,682,907 A | * | 7/1954 | Krueger | 152/222 |
| 2,714,914 A | * | 8/1955 | Champigny | 152/222 |
| 3,934,633 A | * | 1/1976 | Bula | 152/221 |
| 4,261,404 A | * | 4/1981 | Lew | 152/221 |
| 4,308,906 A | * | 1/1982 | Bula et al. | 152/219 |
| 5,082,039 A | * | 1/1992 | Franklin | 152/241 |
| 5,280,816 A | * | 1/1994 | Connelly | 152/243 |
| 5,299,613 A | * | 4/1994 | Maresh | 152/221 |
| 2010/0065175 A1 | * | 3/2010 | Pengg et al. | 152/241 |

FOREIGN PATENT DOCUMENTS

| | | |
|---|---|---|
| AT | 500 295 A1 | 11/2005 |
| EP | 0 911 194 A2 | 4/1999 |
| EP | 0 976 588 A1 | 2/2000 |
| EP | 1 520 734 A2 | 4/2005 |
| JP | 2002-301918 | 10/2002 |
| WO | WO 2008/058304 A2 | 5/2008 |

OTHER PUBLICATIONS

Machine translation of AT 500295 to Ottinger, 4 pages.*

* cited by examiner

Primary Examiner — Jason Bellinger
(74) Attorney, Agent, or Firm — RatnerPrestia

(57) ABSTRACT

In an anti-skid chain with a continuous chain mesh with track crosses and a side cable fitted on a tire side when mounted, e.g. an outer side cable fitted on the outer side of the tire, as well as a tension cable fitted on the other tire side, e.g. an inner cable lying on the inner side of the tire, there are connecting elements on the tension cable, into each of which either a hook connecting the tension cable with at least one track cross or chain parts of the continuous chain mesh are directly hooked, and which are clamped on a sheathing of the tension cable secured against slippage. At least one protrusion for fixing or clamping a sheathing of the tension cable can additionally by provided on an inner surface of the connecting elements facing towards the tension cable.

15 Claims, 5 Drawing Sheets

ANTI-SKID CHAIN

FIELD OF THE INVENTION

The present invention concerns an anti-skid chain with a continuous chain mesh with track chains and a side cable which, when mounted, is located on the side of a tire (for example the outer side of the tire), as well as a tension cable which, when mounted, is located on the opposite side of the tire (e.g. the inner side of the tire).

In this application, a side cable is understood as a side chain that is not used as a tension cable. The side cable is preferably realized closed, i.e., loop-shaped, for instance running along a line of circumference of the tire. On anti-skid chains primarily seen here, in a mounted state the cable in the inner side of the tire serves to tension the anti-skid chain, although the outer cable can also be constructed as the tension cable.

BACKGROUND OF THE INVENTION

AT 500295 B1 discloses an anti-skid chain for being mounted onto a vehicle tire on a wheel rim, which is, on the parts of the chain that may come into contact with the wheel rim, provided with a rim protection element that forms a bracket for a tension cable present on the outer side of the tire. The known rim protection elements have brackets through which the tension cable can be pulled with the aim of tensioning. A disadvantage of this known embodiment is above all that in an anti-skid chain, in which the tension cable is arranged on the inner side of the tire and only a side cable is provided on the outer side of the tire, no good connection of the track chain on the side cable is ensured.

EP 1 520 734 A2 discloses a tensioning device for snow chains, in which the track chain is hung on hooks into the side cable. A crosshead of this tensioning device surrounds the chain link of the side cable onto which such a hook is hooked, while leaving the hook itself free, so that it can come into contact with the wheel rim as before. In EP 0 976 588 A1 a rim protection device is described that wholly surrounds the hooks together with the end links of the continuous chain mesh.

In order to connect the track chain onto tension cables, including an inner cable, U.S. Pat. No. 2,685,321 suggests attaching clips that nevertheless can be displaced along the tension cable.

EP 0 911 194 A2 and JP 2002-301918 A disclose clamps for fastening the ends of continuous chain meshes to a side cable, which are nevertheless not set up for fastening to a ductile cable.

In another approach aiming to enable connection of the track chain onto the tension cable, in which no displacement along the tension cable needs to be worried about, the sheathing of the tension cable has discontinuities, so that the tension cable has a smaller cross section in these places. The discontinuities of the sheathing are used to fasten hooks for connecting the tension cable with the track chain. This prior-art method has the disadvantage, however, that it is very elaborate and hence imposes high manufacturing costs. Moreover, the hooks can rotate about the tension cable as an axle, even if lateral slippage can be largely prevented by the sheathing. Mounting is, however, made more difficult by the fact that the hooks can be rotated about the tension cable, in particular if this is an inner cable.

SUMMARY OF THE INVENTION

Aspects of the invention overcome the abovementioned disadvantage of the prior art, and provide a durable connection that is stable in position with a ductile inner cable or outer cable.

According to the invention an anti-skid chain of the type mentioned in the introduction in that connecting elements, into each of which a hook or chain cable of the continuous chain mesh connected with at least one track chain to the tension cable are directly hung, are clamped—secured against slippage—onto an additional sheathing of the tension cable.

The above-mentioned disadvantages are overcome by this solution according to the invention in an efficient manner. A particularly reliable function and simple manipulation of the anti-skid chain is obtained.

It is likewise suitable for a simple assembly if the connecting element is constructed in two pieces with a front piece facing away from the outer side of the tire and a rear piece facing towards the outer side of the tire.

For simple fastening of the hook, the connecting element may have at least one opening for hanging the hook on.

A good hold of the connecting element can be ensured by the connecting element being allocated a guide channel, wherein the projections are arranged for fixing, or clamping, the sheathing of the tension cable. Herein, a half of the guide channel with a U-shaped cross section may be arranged both in the front piece of the connecting element, and in the rear piece of the connecting element.

A good connection of the front and rear piece can be ensured by the front piece and the rear piece of the connecting element being connected to each other by at least one fastening, for example a rivet or a screw.

According to a further embodiment of the invention, the connecting element may have a lower part that can be clamped onto the tension cable with at least one section protruding away from the side cable and essentially travelling parallel to a tire flank, with a connecting eye for the hook, wherein additionally a fixture is provided, wherein, when mounted, the hook passes through a segment of said fixture, and the fixture is adapted to be pushed on the lower part that, when mounted, essentially surrounds at least said section.

A good clamping effect on the tension cable can be achieved by providing, on an inner surface of the connecting elements facing the tension cable, at least one protrusion for affixing or clamping a sheathing of the tension cable. In particular, in the embodiment just presented the lower part may have at least one clamping protrusion in the direction of the cable on at least its inner surfaces facing the surface of the cable.

It is particularly advantageous in the sense of comfortable manipulation and good functionality if the tension cable is constructed as tenso-elastic cable (tenso-elastic=elastic under tensile force) with a centrifugal force-activated turnbuckle. Turnbuckles activated by centrifugal force are disclosed for example in WO 2008/058304 A2 of the applicant. For example, the tenso-elastic cable may have a pull-spring that is surrounded by a wrapping serving as sheathing.

In an advantageous further development, a tenso-elastic cable may have a cladding with filaments, which are merely stretchable to a maximum extension of the tension cable, serving as blocking threads. This results in a protection of the tension cable, in particular of the mentioned pull-spring, before overstretching. The filaments may advantageously consist of one of the plastics based on polyester and/or a para-aramid.

In a further development of the invention, the track chains are joined with the outer side cable by hooks hung into at least one chain link of the side cable each, wherein for each hook a rim protection covering is provided surrounding the hook and the at least one chain link. This configuration allows achieving both a good joining of the side cable onto the track chain and a very efficient rim protection.

In this further development, a subsequent mounting of the rim protection covering on the anti-skid chain is made substantially easier by providing that the rim protection covering has a front piece facing away from the outer side of the tire and a rear piece facing towards the tire outer side, wherein front and rear pieces have recesses for accommodating the at least one chain link and the hook. The mounting may also be made even easier by a configuration where the front piece and the rear piece of the rim protection covering comprise a snap-action connection for being affixed onto the hook and the at least one chain link, wherein at least one of the two sides of the rim protection covering has at least one protrusion and the other side has at least one opening corresponding to the protrusion, so the protrusion can be snapped in place with the opening. The manipulation of the rim protection covering is, moreover, made substantially easier if the front and rear pieces of the rim protection covering are joined by means of a hinge-like joint. Advantageously the rim protection covering may substantially surround the hook, the chain link of the side cable into which the hook is hung, as well as sections of the chain links next to this chain link on the left and the right, when mounted. Furthermore, a scratching of the wheel rim may be especially well prevented by providing a rim protection covering made of plastic.

The manipulation and comfort of operation may be further improved in that at least one of the rim protection coverings is identified in a specific manner, for example by a particular coloring. The identification is very helpful above all for mounting and dismantling of the chain, since for the user the relative position of the chain on the tire can be established with a glance.

BRIEF DESCRIPTION OF THE DRAWINGS

The invention together with further advantages is described in more detail in what follows on the basis of a few non-limiting exemplary embodiments, which are depicted in the drawings. These show schematically.

DETAILED DESCRIPTION OF THE INVENTION

Figures 1, 2:
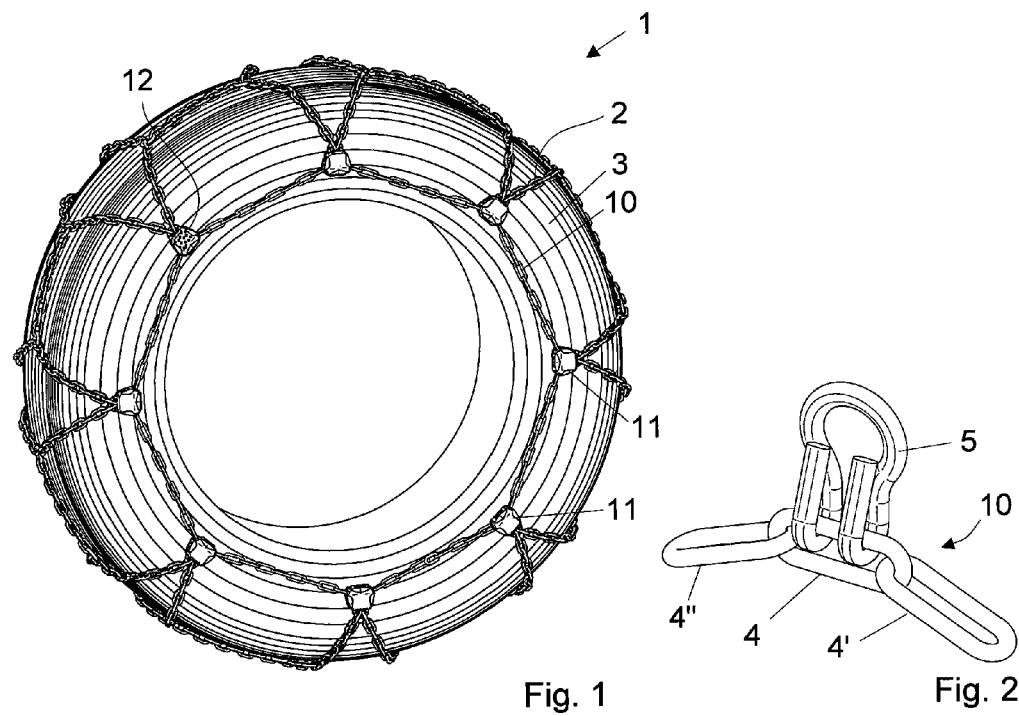
FIG. 1 the outer side of a tire with an anti-skid chain according to the invention with an outer side cable and an inner tension cable.
FIG. 2 a section of an outer side cable of the anti-skid chain from FIG. 1 with a hook hung in a chain link of the side cable for joining the side cable onto a track chain, in perspective view.

According to FIG. 1, an anti-skid chain 1 according to the invention has a continuous chain mesh with track chains 2 and a side cable 10 located on a outer side of the tire 3 when mounted.

The track chains 2 are joined to the side cable 10 by hooks 5 each hung into at least one chain link 4 of the side cable 10 (FIG. 2). A rim protection covering 11 surrounding the hook 5 and the at least one chain link 4 may be provided for each hook 5. In order to make mounting and dismantling easier, at least one of the rim protection coverings 11 can be particularly identified, for example by a particular coloring. So, in the drawing according to FIG. 1 a rim protection covering 12 is particularly identified by color (drawn dotted). An exact position of the chain on the wheel can be indicated by identification of the rim protection covering 12. Identification may be done e.g. in that the rim protection covering 12 has a different color to the other rim protection coverings 11.

Figures 3, 4:
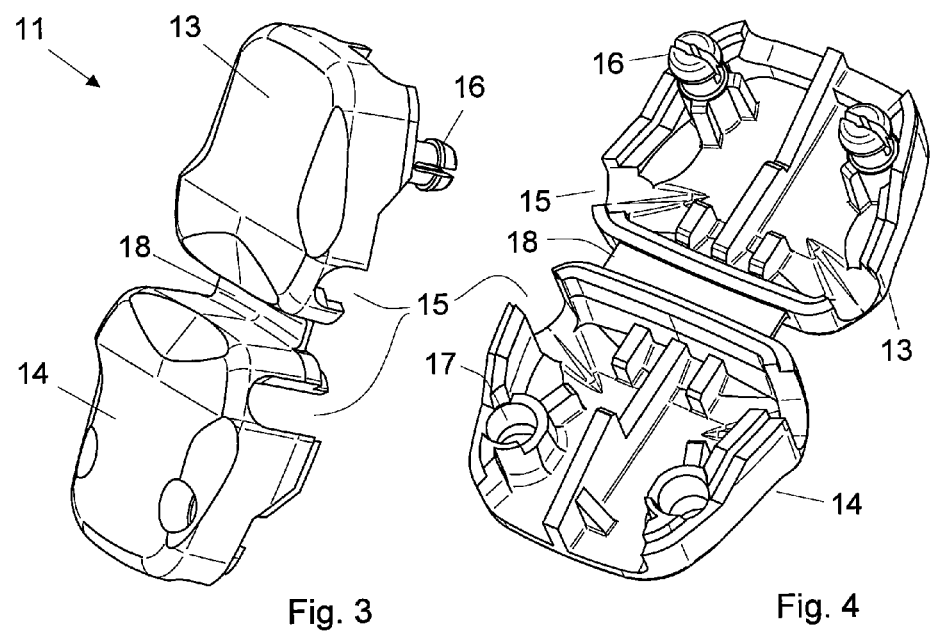
FIGS. 3 and 4 a rim protection covering according to the invention in an open condition in perspective view on the outer side (FIG. 3) and the inner side (FIG. 4) of the device.

According to FIG. 3, the covering 11 has a front piece 13 facing away from the outer side of the tire and a rear piece 14 facing towards the outer side of the tire. Front piece 13 and rear piece 14 have recesses 15 for the at least one chain link 4 and the hook 5 to slot into.

Referring to FIG. 4, the front piece 13 and the rear piece 14 of the covering 11 may be affixed by means of a snap-action connection to the hook 5 and to the at least one chain link 4. Here, at least one of the two sides of the covering 11 may have one protrusion 16 and the other side may have at least one opening 17, corresponding with the protrusion 16, into which the protrusion 16 can be snapped into place.

Further, the front 13 and rear 14 pieces of the rim protection covering 11 may be joined by means of a hinge-like joint 18. Moreover, front piece 13 and rear piece 14 as well as the joint 18 may be constructed as one piece with each other. In a single-piece construction of the rim protection covering 11, it is advantageous, in particular for manufacturing technical reasons, if the covering 11 is made of plastic. A very good protection of the rim against damage is effected by the use of plastic as the material for the rim protection covering 11, too.

Figure 5:
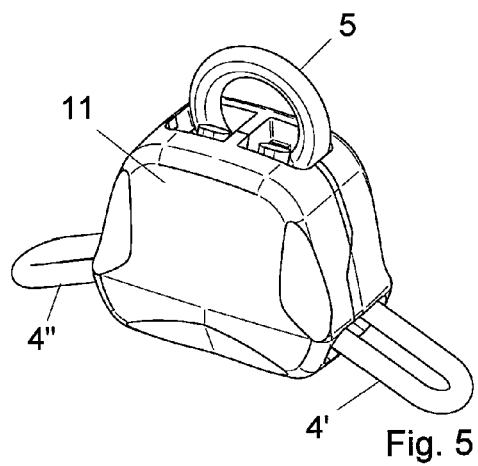
FIG. 5 the section of the side cable from FIG. 2 with the rim protection covering mounted on it, in perspective view.
Figure 6:
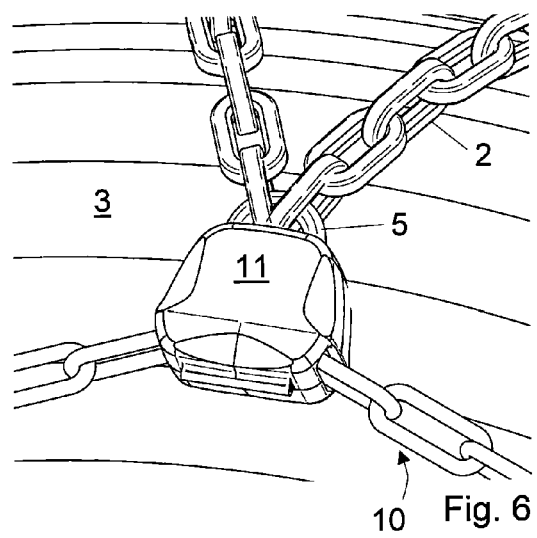
FIG. 6 the mounted rim protection covering from FIG. 5 with chain cables of the track chain hung into it, in perspective view.

According to FIGS. 5 and 6, the rim protection covering 11 can substantially enclose the hook 5, the chain link 4 (not visible in these figures) of the side cable 10, into which the hook is hung, as well as sections of the chain links 4', 4" next to this chain link 4 on the left and right.

Figure 8:
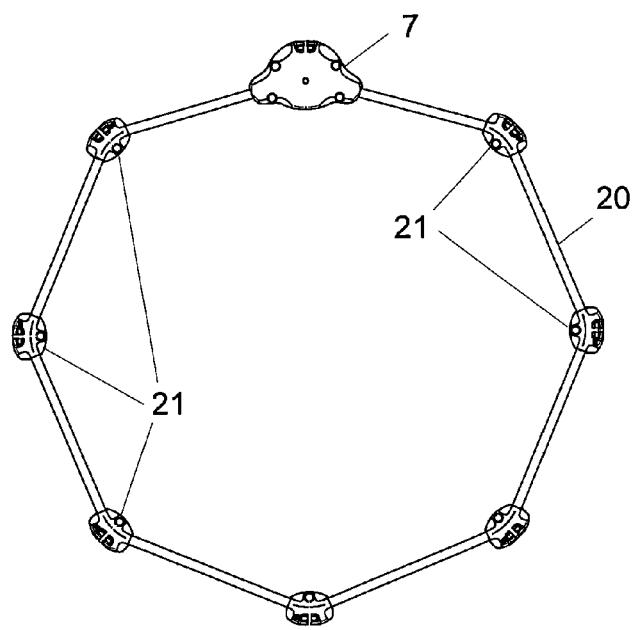
FIG. 8 the inner cable (without track chain) with the connecting elements arranged on it and a turnbuckle.
Figure 7:
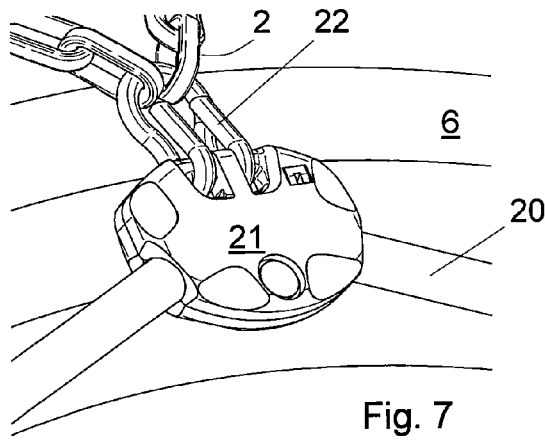
FIG. 7 the fastening of chain cables of the track chain to an inner cable by means of a connecting element according to the invention.

As is illustrated in FIGS. 7 and 8, the anti-skid chain 1 may have a tension cable in the shape of an inner cable 20 lying on the inner side of the tire 6, onto which connecting elements 21 are clamped, secured against slippage and rotation. The connecting elements 21 may be arranged all around on the inner cable 20, wherein a predetermined gap is maintained between two neighboring connecting elements 21, as is illustrated in FIG. 8 (which only shows the inner cable 20 and the components of the anti-skid chain 1 directly attached to it). Advantageously the inner cable 20 may be constructed as a tenso-elastic cable with a centrifugal force-activated turnbuckle 7, e.g. according to one of the embodiments shown in WO 2008/058304 A2 of the applicant.

Figure 9:
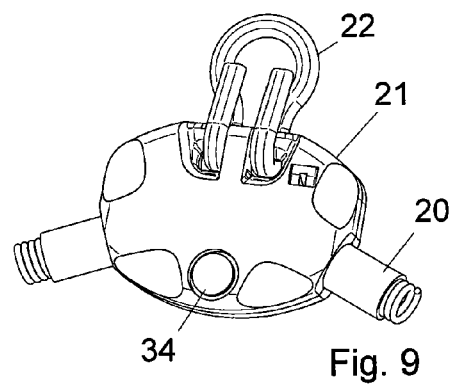
FIG. 9 a connecting element for joining an inner cable onto the track chain of the anti-skid chain with a hook hung on it.

Referring to FIG. 9, a hook 22 joining the inner cable 20 with the continuous chain mesh or the track chains 2, or directly chain parts of the track chain 2 (cf. FIG. 15 as described below) may be hooked on in each of the connecting elements 21.

Figure 10:
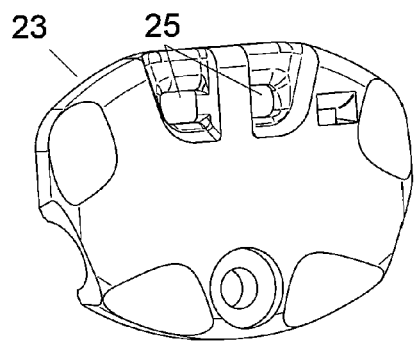
FIGS. 10 and 11 the front piece or rear piece of the connecting element from FIG. 9.
Figure 11:
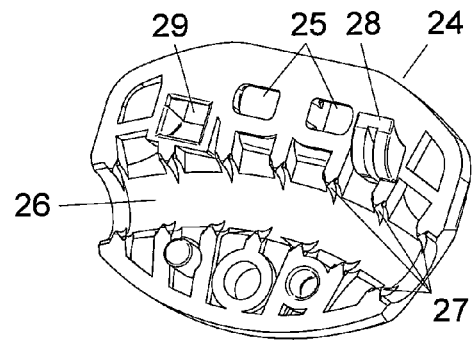

FIGS. 10 and 11 show that the connecting element 21 may be constructed in two pieces, with a front piece 23 facing away from the outer side of the tire and a rear piece 24 facing towards the outer side of the tire. In the embodiment shown here, front and rear piece 23, 24 are identical in construction, which allows that advantageously the same component, both front and rear piece, are used due to the identical construction, and a connecting element 21 is hence composed of two identical halves (cf. FIG. 13).

At least one opening 25 for hooking on a hook 22 is located in the upper piece (to the section facing towards the wheel arch surface) of the component 23, 24. Both plastics and metals come into consideration as material for the connecting element 21 (front and rear piece).

According to FIG. 11, the connecting element 21 may have a guide channel 26, in which protrusions 27 for affixing or clamping a sheathing of the inner cable 20 are arranged. A half of the guide channel 26 with a U-shaped cross-section may hence be arranged both in the front piece 23 of the connecting element 21 and in the rear piece 24 of the connecting element 21.

Figure 12:
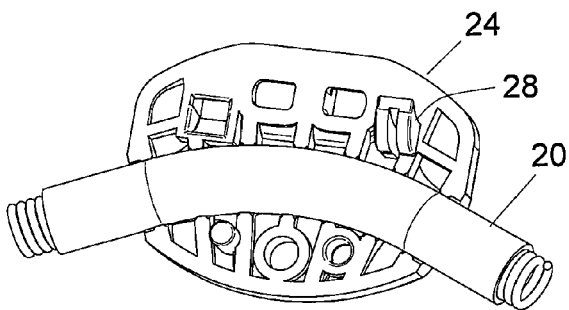
FIG. 12 a piece of the connecting element from FIG. 9 with an inner cable inserted in it, in perspective view.
Figure 13:
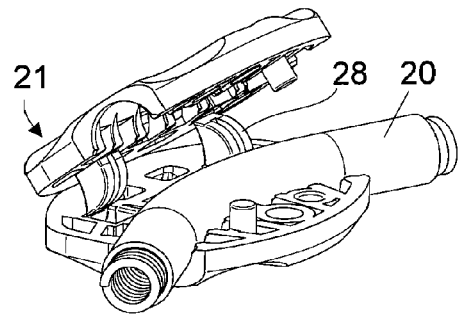
FIG. 13 a perspective view of the assembled and partially open connecting element from FIG. 9, with inner cable inserted.
Figure 14:
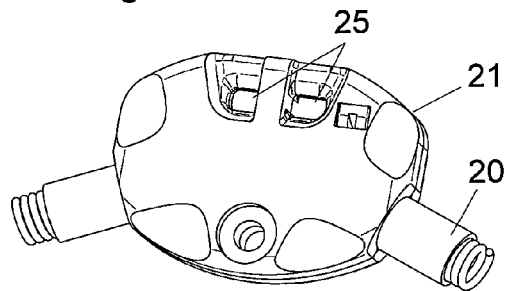
FIG. 14 the connecting element from FIG. 9 when assembled and mounted on the inner cable.

FIGS. 12 to 14 show the connecting element 21 with inner cable 20 inserted in it. Guide bolts 28, that engage form-fit in a corresponding opening 29 of the other piece and are arranged on the inner side of the front 23 or rear 24 piece of the connecting element 21, can ensure a very good mounting on the inner cable 20. In an embodiment with the front and rear pieces identical in construction, guide bolts and corresponding opening 29 are provided on the same component, so that in each case a guide bolt of one component 23, 24 can engage in an opening of the other component. Through this, a form-fit connection between front 23 and rear 24 pieces of the connecting element 21 can be manufactured. A clamping of the connecting element 21 onto the inner cable 20 can therefore be easily carried out.

Once again referring to FIG. 9, the front piece 23 and the rear piece 24 of the connecting element 21 may additionally be joined to each other by at least one fastening 34, for example a rivet or a screw.

Figure 15:
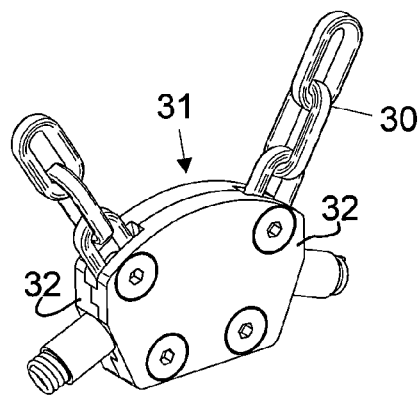
FIG. 15 a perspective view of a variant of a connecting element according to the invention, mounted on an inner cable, in which end sections, or end links, of two chain cables of the track chains of the anti-skid chain according to the invention, are hung directly without the interconnection of a hook.
Figure 16:
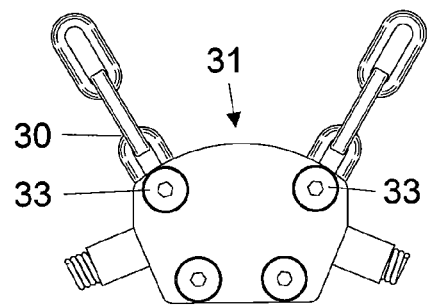
FIG. 16 the connecting element from FIG. 15, in front view.

FIGS. 15 and 16 show a further embodiment of the connecting piece 31, which can also be hooked on directly into the chain cable 30 of the continuous chain mesh or the track chains 2. Here, two end chain links may be hooked in two opposite end sections 32 of the connecting piece, and by a rivet or a screw 33 each may be fixed against any slippage out of the connecting piece 31. Both plastics and metals come into consideration as material for the connecting piece 31.

Figure 17:
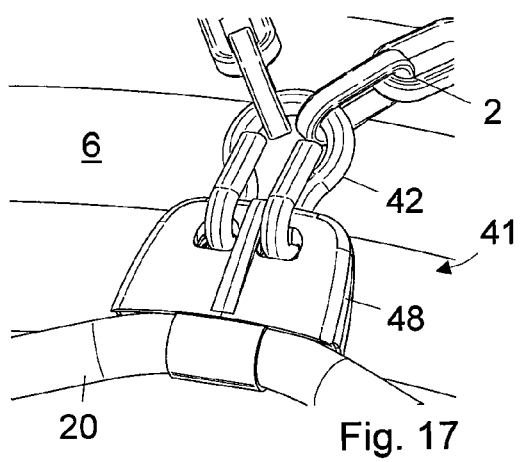
FIG. 17 a further variant of a connecting element that can be clamped onto an inner cable, in a mounted condition.
Figure 18:
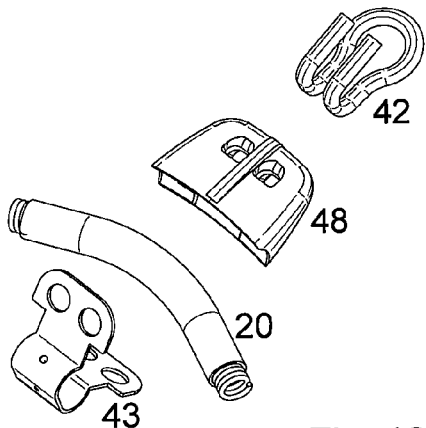
FIG. 18 an exploded view of the connecting element from FIG. 17.

In FIGS. 17 and 18 a further variation of the invention is depicted, according to which the connecting element 41 has a lower part 43 which can be clamped onto the inner cable 20 protected against slippage and rotation. The join of the inner cable 20 onto the track chain 2 or the continuous chain mesh is done by hooks 42 engaging into the connecting element 41.

Figure 19:
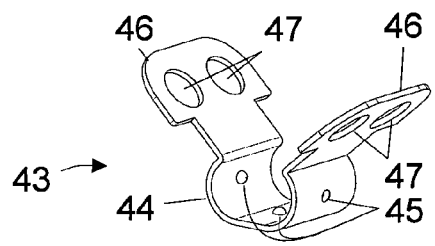
FIGS. 19 and 20 perspective views of two variations, respectively, of a lower part of the connecting element from FIG. 17.
Figure 20:
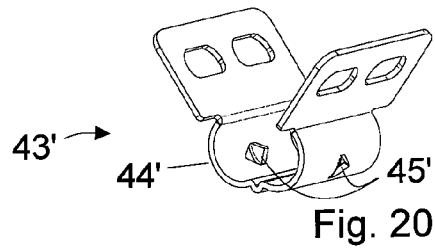

As can be seen from FIGS. 19 and 20, which show two equally suitable variations of the lower part 43, 43', these components may be constructed as bent metal parts with a substantially U-shaped cross-section, wherein a base section 44, 44' of the U-shape may be constructed bellied to a channel, in order to be able to receive the inner cable 20. On its inner surfaces facing towards the surfaces of the inner cable 20, the lower part 43, 43' may also have one or several clamping protrusions 45, 45'. The lower part 43 additionally has at least one section 46 that is provided with one or two connecting eyes 47 for the hook 42.

Figure 21:
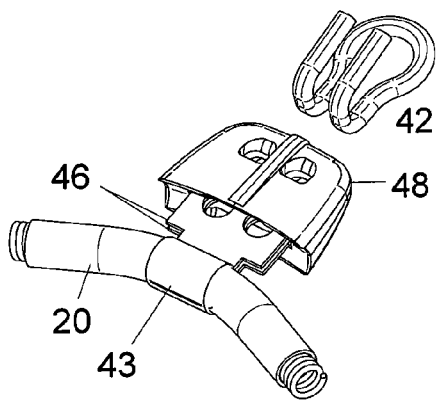
FIG. 21 the connecting element from FIG. 17 in a condition of being partially mounted on the inner cable, in perspective view.

Referring to FIG. 21, the section 46 protrudes when mounted away from the side cable 20 and runs essentially parallel to a tire flank. Furthermore, a fixture 48, clamped in sections by the hooks 42 when mounted, in the shape of a plastic covering may be provided, which can be pushed onto the lower part 43. At least the section 46 of the lower part 43 is essentially enclosed by the fixture 48 when mounted. The lower part 43 is preferably made of metal, while the fixture 48 is preferably manufactured out of plastic.

The inner cable 20, onto which the connecting elements 21, 31, 41 are fastened, advantageously has a tenso-elastic cable (cord), preferably in the form of a pull-spring 19. The cord formed from the pull-spring 19 may be closed off into a circle with the help of a turnbuckle 7, as illustrated in FIG. 8, wherein the turnbuckle is centrifugal force-activated, i.e. it blocks movement of the cable through the turnbuckle if the wheel on which the anti-skid chain 1 is mounted turns. The anti-skid chain may, however, also be constructed without a turnbuckle if the elasticity of the tension cable allows for this.

Figure 22:
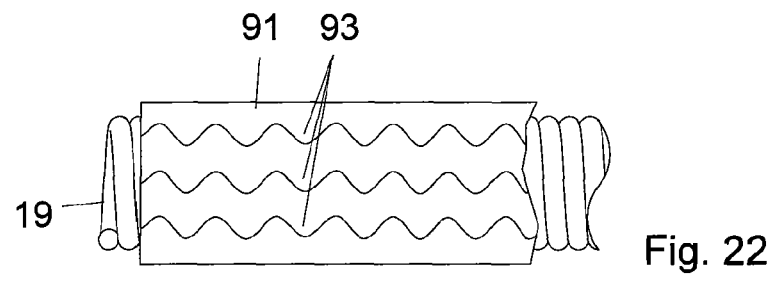
FIG. 22 a section of the side cable with a sheathing (wrapping) containing blocking thread.
Figure 23:
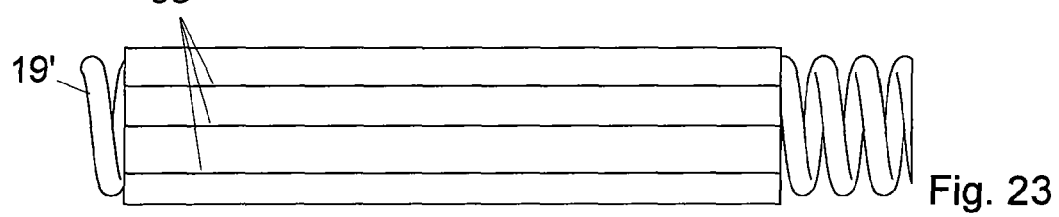
FIG. 23 the side cable from FIG. 22 when stretched out.
Figure 24:
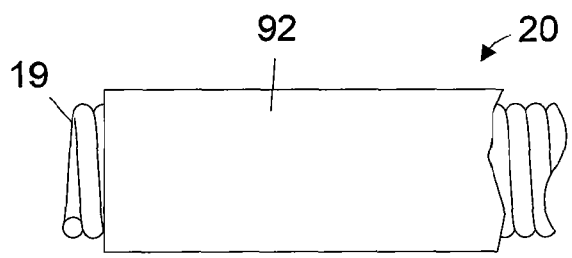
FIG. 24 a section of a variation of the side cable with an envelopment containing rubber threads.
Figure 25:
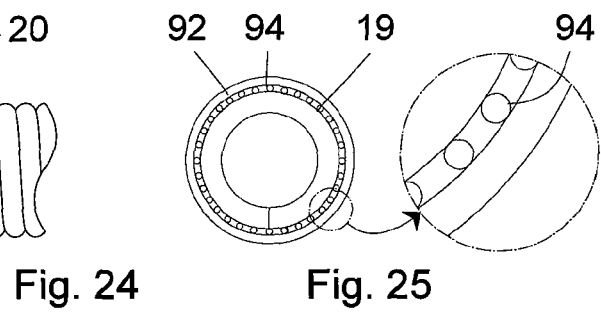
FIGS. 25 and 26 cross sections of the side cables from FIG. 24 in idle position or stretched position, respectively.
Figure 26:
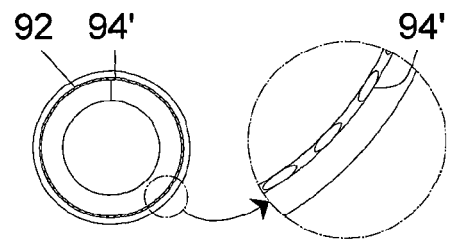

Referring to FIGS. 22 to 26, the pull-spring 19 may be encased by a covering (sheathing) 91, 92 acting as a casing. Due to the covering, the connecting elements 21, 31, 41 applied to the cable 20 cannot be displaced, through which the form of the continuous chain mesh is maintained and stabilized. What is more, the covering 91, 92 brings protection of the pull-spring 19 against overstretching. This a practically sufficient use of a pull-spring of a pull spring of the required type as a tensioning element in all operating situations of an anti-skid chain. In FIGS. 22 to 24 the sheathing of the pull-spring is displaced to the ends of the cable 20 simply for the sake of clarity of the depiction is removed.

In FIG. 22 a wrapping 91 is shown that has fillaments 93 that have a defined maximum length. When idle, these filaments 93 are curled or wound up, as shown in the drawing. When the tension cable is stretched, as shown in FIG. 23, the filaments 93' are reversibly stretched and prevent extension over a length corresponding to that of the straight alignment of the track chains. The pull-spring 19' can always spring back to its original length due to the reversible alignment of the filaments.

FIG. 24 shows another possibility for a wrapping 92. Here, the wrapping 92 contains rubber threads 94 that are equally distributed over the circumference of the pull-spring and are attached in such a way that they are arranged at a specific distance from the pull-spring when idle. Through the interlacing of the individual fabric threads upon stretching out the tension cable 20, the diameter of the wrapping 92 naturally is shrunk; the rubber threads 94 are hereby pressed flat until no further shrinkage of the diameter is possible and so no further stretching can take place. This is shown in the cross-section views FIGS. 25 and 26, which show the cross-section of the wrapping 92 in idle and active positions of the end stretching. As can be seen from FIG. 26, upon stretching the rubber threads 94' are deformed and squeezed until no further shrinkage of the space taken up by the rubber threads is possible.

A further advantage of the wrapping 91, 92 results in a protection of the user's finger upon mounting and dismantling of the anti-skid chain here provided. Upon stretching of a coil spring there is the basic danger that skin or other body parts could get in between the open spring coils and get caught in there when the tension cable springs back together. This is prevented by the wrapping in a simple way.

Polyester and/or para-aramid based filaments that maintain the required abrasion resistance and tensile strength can be used as material for the wrapping.

In the embodiments shown, the side cable 10 is on the outer side of the tire in a mounted position, while the anti-skid chain is stretched by means of a tension cable that is located as the inner cable 20 of the inner side of the tire. The invention nevertheless also comprises embodiments in which the roles of inner and outer cable are reversed, hence the anti-skid chain is set up in such a way that the tension cable is located on the outside (as outer tension cable).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. An anti-skid chain for use with a tire comprising:
a continuous chain mesh with track chains, and having at least one of hooks and chain parts;
a side cable fitting on a first side of the tire when mounted;
a stretchable tension cable fitting on a second side of the tire opposite the first side when mounted, said stretchable tension cable having a sheathing; and
a plurality of connecting elements,
wherein the plurality of connecting elements are clamped onto the sheathing of the stretchable tension cable in a manner to secure against slippage, and wherein the hooks or chain parts of the continuous chain mesh, each joining the stretchable tension cable with at least one of the track chains, are hooked directly into openings of the respective connecting elements.

2. The anti-skid chain according to claim 1, wherein the tension cable is configured as an inner cable lying on an inner side of the tire when mounted, and the side cable is configured to lie on an outer side of the tire when mounted.

3. The anti-skid chain according to claim 1, wherein the connecting elements each have at least one opening for hooking on the hook.

4. The anti-skid chain according to claim 1, wherein the connecting elements are each constructed with a front piece facing away from the side of the tire in an axial direction and a rear piece facing towards the side of the tire in the axial direction.

5. The anti-skid chain according to claim 1, wherein the connecting elements each have a guide channel, in which protrusions for fixing or clamping are arranged.

6. The anti-skid chain according to claim 5, wherein both in the front piece of each connecting element and in the rear piece of each connecting element is arranged a half of the guide channel each having a U-shaped cross-section.

7. The anti-skid chain according to claim 4, wherein the front piece and the rear piece of each connecting element are joined to each other by at least one fastener.

8. The anti-skid chain according to claim 4, wherein the front piece and the rear piece of a connecting element are each identical in construction configuration.

9. The anti-skid chain according to claim 1, wherein the connecting elements each have a lower part that can be clamped on the tension cable, having at least one section projecting away from the side cable when mounted and running substantially parallel to a tire flank, with a connecting eye for the hook, wherein additionally a fixture is provided through a segment of which the hook passes and which is adapted to be pushed onto the lower part, the lower part essentially surrounding at least said section when mounted.

10. The anti-skid chain according to claim 9, wherein the lower part on its inner surfaces facing towards the surface of the tension cable has at least one clamping protrusion in a direction of the tension cable.

11. The anti-skid chain according to claim 1, wherein the tension cable is configured as a tenso-elastic cable with a centrifugal force-activated turnbuckle.

12. The anti-skid chain according to claim 1, wherein the tension cable is constructed as a tenso-elastic cable having a sheathing with filaments that are adapted to stretch to a maximum extension of the cable acting as track chains.

13. The anti-skid chain according to claim 12, wherein the filaments consist of a plastic that is selected from the group consisting of polyester-based plastics and para-aramid based plastics.

14. The anti-skid chain according to claim 11, wherein the tenso-elastic tension cable has a pull-spring surrounded by a wrapping acting as sheathing.

15. The anti-skid chain according to claim 7, wherein the fastener is a rivet or a screw.

* * * * *